US012752706B2

(12) United States Patent
Seibold

(10) Patent No.: US 12,752,706 B2
(45) Date of Patent: Oct. 6, 2026

(54) VEHICLE MIRROR

(71) Applicant: Dr. Ing. h.c. F. Porsche Aktiengesellschaft, Stuttgart (DE)

(72) Inventor: Thomas Seibold, Ostfildern (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 373 days.

(21) Appl. No.: 18/232,411

(22) Filed: Aug. 10, 2023

(65) Prior Publication Data

US 2024/0059218 A1 Feb. 22, 2024

(30) Foreign Application Priority Data

Aug. 22, 2022 (DE) ..................... 10 2022 121 146.0

(51) Int. Cl.
*B60R 1/06* (2006.01)

(52) U.S. Cl.
CPC ...................................... *B60R 1/06* (2013.01)

(58) Field of Classification Search
CPC B60R 1/06; B60R 1/72; B60R 1/0605; B60R 1/0602
USPC .......................................................... 359/838
See application file for complete search history.

(56) References Cited

U.S. PATENT DOCUMENTS

| | | | | |
|---|---|---|---|---|
| 6,347,872 | B1 | 2/2002 | Brechbill et al. | |
| 2001/0026411 | A1* | 10/2001 | Horio | B60R 1/06 359/881 |
| 2013/0242586 | A1* | 9/2013 | Huizen | F21S 43/245 362/494 |

FOREIGN PATENT DOCUMENTS

| | | | |
|---|---|---|---|
| DE | 10014406 | A1 | 10/2001 |
| EP | 1604867 | A1 | 12/2005 |
| EP | 3412508 | A1 | 12/2018 |

* cited by examiner

*Primary Examiner* — Bumsuk Won
*Assistant Examiner* — Rahman Abdur
(74) *Attorney, Agent, or Firm* — Buchanan Ingersoll & Rooney PC

(57) ABSTRACT

A mirror housing for an outer mirror of a vehicle, preferably a passenger car, having an outer shell for receiving a mirror assembly, and having an inner shell. The outer shell includes a mirror opening closed in a circumferential direction for arranging a mirror of the mirror assembly. The inner shell is fastened to the outer shell in the region of the mirror opening. The inner shell lines the mirror opening from the inside along the circumferential direction.

11 Claims, 2 Drawing Sheets

VEHICLE MIRROR

CROSS-REFERENCE TO RELATED APPLICATION

This application claims priority to German Patent Application No. 10 2022 121 146.0, filed Aug. 22, 2022, the content of such application being incorporated by reference herein in its entirety.

FIELD OF THE INVENTION

The present invention relates to a mirror housing. The invention also relates to an outer mirror equipped with such a mirror housing, as well as a motor vehicle equipped with such an outer mirror.

BACKGROUND OF THE INVENTION

Outer mirrors of this type are used in vehicles, preferably in passenger cars, wherein they are arranged on the driver's side and/or on the passenger's side on the exterior of the vehicle. Such outer mirrors can also be referred to as outer rearview mirrors or vehicle exterior mirrors.

A generic mirror housing is known from U.S. Pat. No. 6,347,872 B1, which is incorporated by reference herein, for example, and comprises an outer shell for receiving a mirror assembly, as well as an inner shell. The outer shell comprises a mirror opening closed in a circumferential direction for arranging a mirror of the mirror assembly. The inner shell is fastened to the outer shell in the region of the mirror opening, wherein the inner shell lines the mirror opening from the inside along the circumferential direction. In the known mirror housing, the inner shell is configured so as to form an outer contour of the mirror housing that encases the mirror opening in the assembled state. This is adjoined by a much larger region of the outer contour of the mirror housing formed by the outer shell. A groove or joint is thereby formed on the outside of the mirror housing at the transition between the inner shell and the outer shell. Such joints can be disadvantageous. For example, contaminants can tend to build up at or in such joints. Likewise, a high precision is required in the manufacture of the outer shell and the inner shell as well as during assembly in order to create a visually appealing joint pattern with a high-quality appearance.

A similar mirror housing is known from EP 1 604 867 A1, which is incorporated by reference herein, wherein there the mirror assembly is received within the inner shell.

The mirror housing in EP 3 412 508 A1, which is incorporated by reference herein, is also configured such that the mirror assembly is received in the inner shell.

A further mirror housing is known from DE 100 14 406 A1, which is incorporated by reference herein, in which an upper shell and a lower shell are provided, so that the mirror opening is partially formed by the upper shell and partially by the lower shell. A frame part that closes in the circumferential direction is fastened to the upper shell and the lower shell in the region of the mirror opening, whereby the frame part defines the upper shell on the one hand and encases the mirror opening on the other hand.

Various requirements may need to be met by a mirror housing in order to achieve a high-quality appearance. On the one hand, an outer contour of the mirror housing should have as few joints as possible, which must also be realized with high precision. On the other hand, for the mirror in the mirror opening, a mirror frame must be realized, which has a frame contour circumferentially along the mirror. The mirror assembly of an outer mirror is typically configured such that the mirror is adjustable within the mirror opening relative to the mirror housing. The frame contour should be configured as far as possible in such a way that it creates an optically appealing frame for the mirror in different mirror positions. For a comparatively inexpensive production in a large number of units, the outer shell, which usually defines a substantial component of the outer contour of the mirror housing, and the inner shell, which usually defines a substantial proportion of the frame contour, are preferably castings, in particular injection moldings. In connection with the different contour requirements, this results in problems in the deformation of the castings or injection moldings. A joint in the outer contour of the mirror housing between the outer shell and the inner shell therefore appears unavoidable when the inner shell and the outer shell continue to be cast parts or injection-molded parts.

SUMMARY OF THE INVENTION

The present invention provides an advantageous, or at least a different, embodiment for a mirror housing of the type described above, or for an outer mirror equipped therewith, or for a motor vehicle equipped therewith, which is characterized in particular by a high-quality appearance with comparatively inexpensive manufacturability.

The inner shell is designed elastically and provides a recess in the circumferential direction. As a result, the inner shell can be elastically deformed for assembly on the outer shell, so that it is possible to insert the inner shell into the outer shell from the outside through the mirror opening for assembly of the mirror housing. With this measure, it is comparatively easy to optimize the outer shell with respect to the outer contour of the mirror housing, while at the same time the inner shell can be optimized for the mirror with respect to the frame contour.

By being able to elastically deform the inner shell for assembly, such that it can be inserted into the outer shell through the mirror opening, it is in particular possible to form the outer contour of the mirror housing exclusively through the outer shell. At the same time, the outer shell and the inner shell can be manufactured inexpensively as cast parts or injected-molded parts. This can improve the value of the mirror housing, while keeping the manufacturing costs comparatively low or moderate.

According to an advantageous embodiment, the outer shell can have an open insertion cross-section in the region of the mirror opening, while the inner shell, when fastened to the outer shell, has an outer cross-section in the region of the mirror opening that is larger than the insertion cross-section. The inner shell can now be elastically deformed for assembly on the outer shell, such that the recess and the outer cross-section of the inner shell reduce in size to the extent that the inner shell can be inserted into the outer shell through the insertion cross-section of the outer shell. For example, the recess can be sized such that the outer cross-section of the inner shell can be reduced to be smaller than the insertion cross-section of the outer shell. However, this is not mandatory. It is also contemplated that the recess is sized so that the outer cross-section can be reduced to such an extent that the inner shell can be inserted into the outer shell when tilted relative to its assembly position, and can then be tilted back into its assembly state inside the outer shell, and can then be relaxed and fixed on the outer shell. The outer cross-section can remain larger than the insertion cross-section.

In a further embodiment, the outer shell in the region of the mirror opening can have an undercut contour, wherein the inner shell inserted into the outer shell engages rearwardly with the undercut contour in a positive-locking manner. For the assembly, the inner shell is inserted into the outer shell in an insertion direction. The undercut contour is configured such that the inner shell engaged therewith is secured in a positive-locking manner against being pulled out of the outer shell counter to the insertion direction. This allows for the realization of a particularly simple fixation of the inner shell on the outer shell.

The undercut contour can in particular be configured as a circumferential step running in the circumferential direction, into which a complementary stop contour of the inner shell engages. The aforementioned insertion cross-section is located in the region of the undercut contour, in particular. Furthermore, an inner cross-section for the outer shell can be defined on the undercut contour, which is designed so to be complementary to the outer cross-section of the inner shell in the relaxed state or in the assembled state, such that the inner shell adjoins said inner cross-section of the undercut contour in the assembled state with its outer cross-section.

In a further embodiment, it can now be provided that a circumferential outer contour of the mirror housing that is closed outwardly in the region of the mirror opening is formed exclusively by a region of the outer shell. In this embodiment, the inner shell is arranged entirely within the outer shell. In particular, in the region of the mirror opening, a jointless outer contour can be realized on the mirror housing.

According to an advantageous embodiment, the inner shell can be integrally configured. In particular, the inner shell can be inexpensively manufactured as a casting or injection molding, preferably made of plastic. Additionally, or alternatively, the outer shell can be integrally configured. The outer shell can thus preferably be manufactured as a casting or injection molding, in particular made of plastic. In conjunction with the inner shell, which is arranged completely within the outer shell, the configuration of the outer shell in a single piece can in particular realize a seamless outer contour for the mirror housing, to the extent that it is defined by the outer shell.

Particularly advantageous is an embodiment in which the recess is at least partially filled and/or closed by a closure element when the inner shell is fastened to the outer shell. The closure element mechanically prevents the elastic deformability of the inner shell, which is associated with a reduction in size of the recess, thereby securing the assembled state. This is particularly advantageous in conjunction with the aforementioned undercut contour, as no further fastening means are then required in order to securely fix the inner shell to the outer shell. In addition, the recess is masked by the closure element, which improves the visual appearance.

Particularly advantageous is a configuration in which the closure element is formed by a component, in particular a blinking element, of an outer mirror indicator. Such outer mirror indicators are widely used in modern vehicles. The functional integration of the closure element into a component of such an outer mirror indicator increases the degree of integration on the mirror housing or outer mirror, which reduces manufacturing costs.

According to a further embodiment, the mirror housing can comprise a foot for fastening the mirror housing to the vehicle, which foot is fastened to the outer shell.

The mirror assembly can then, in the usual manner, enable the mirror to be adjusted within the mirror housing. The adjustment of the mirror can be done manually. Preferably, the mirror assembly can comprise an actuator that mechanically, electrically, or electromechanically allows the mirror to be adjusted.

An outer mirror according to aspects of the invention provided for a motor vehicle, preferably for a passenger vehicle, comprises a mirror housing of the type described above, as well as a mirror assembly comprising a mirror. The mirror arrangement is installed into the outer shell of the mirror housing such that the mirror is arranged in the region of the mirror opening of the mirror housing and is encased by the inner shell of the mirror housing.

A motor vehicle according to aspects of the invention, which can in particular be a passenger vehicle, comprises a body as well as at least one outer mirror of the type described above, which is arranged or mounted on the body.

It goes without saying that the features mentioned above and those yet to be discussed below can be used not only in the respectively specified combination, but also in other combinations or on their own. The components described above and referred to below of a higher-level unit, e.g. a device, an apparatus, or an assembly, which are designated separately, can constitute separate parts or components of this unit, or integral regions or sections of this unit, even if shown differently in the drawings.

BRIEF DESCRIPTION OF THE DRAWINGS

Preferred embodiment examples of the invention are set forth in the drawings and will be explained in further detail in the description below, wherein identical reference numbers refer to identical, similar, or functionally identical components.

The following are shown, in each case schematically.

DETAILED DESCRIPTION OF THE INVENTION

Figure 1:
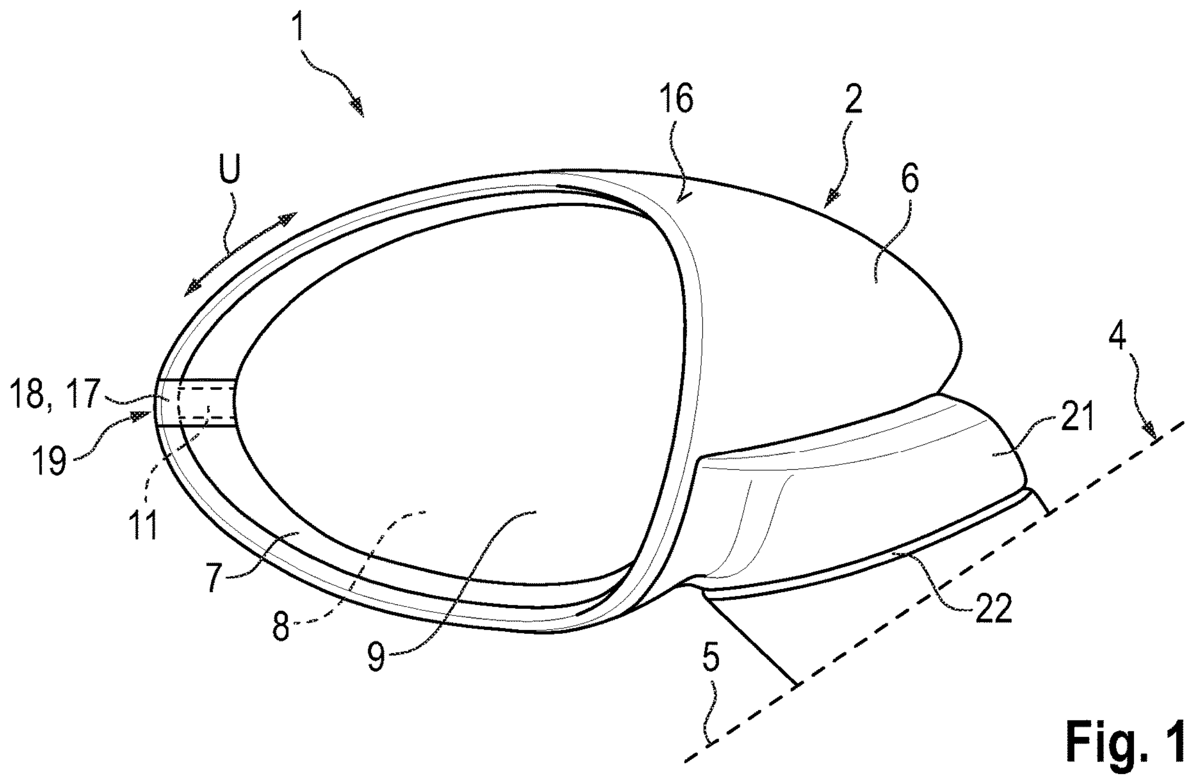
FIG. 1 an isometric view of an outer mirror.
Figure 3:
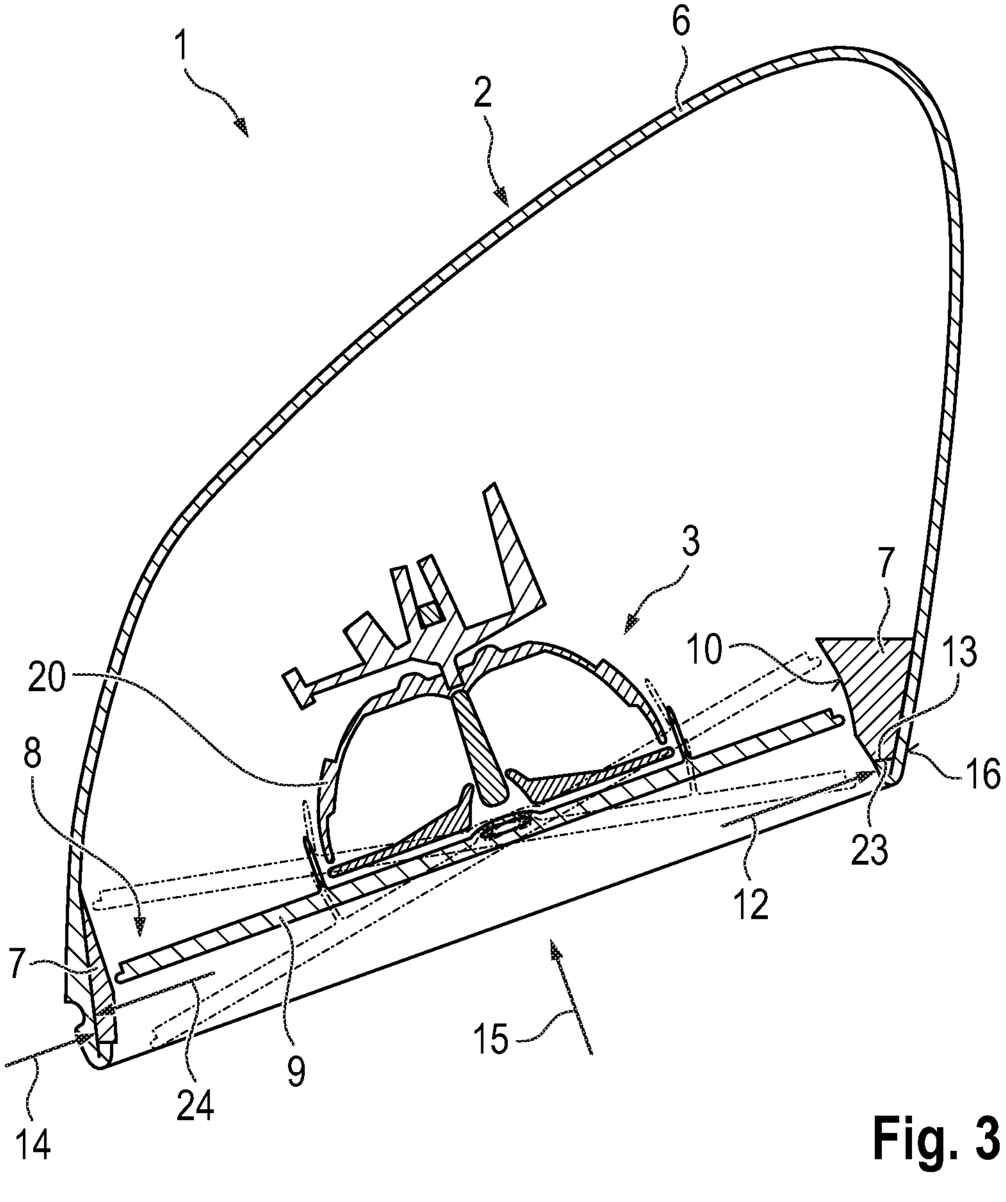
FIG. 3 a sectional view of the outer mirror.

According to FIG. 1, an outer mirror 1 comprises a mirror housing 2 as well as a mirror assembly 3 that can be seen in FIG. 3. The outer mirror 1 is intended to be assembled on a vehicle 4, which in FIG. 1 is indicated by a broken line in the region of a body 5.

According to FIGS. 1 and 3, the mirror housing 2 comprises an outer shell 6 which receives the mirror assembly 3, as well as an inner shell 7. The outer shell 6 has a mirror opening 8 that is closed in a circumferential direction U, in which a mirror 9 of the mirror assembly 3 is arranged. The circumferential direction U is indicated by a double arrow in FIGS. 1 and 2. The mirror opening 8 is closed in the circumferential direction U so that it is completely encased by the outer shell 6 in the circumferential direction U.

The inner shell 7 is fastened to the outer shell 6 in the region of the mirror opening 8 and is configured so as to line the mirror opening 8 from the inside along the circumferential direction U as well as along the outer shell 6. The inner shell 7 thereby forms a frame for the mirror 9 that extends along the circumferential direction U. The inner shell 7 defines a frame contour of the frame on an inner side facing the mirror 9.

Figure 2:
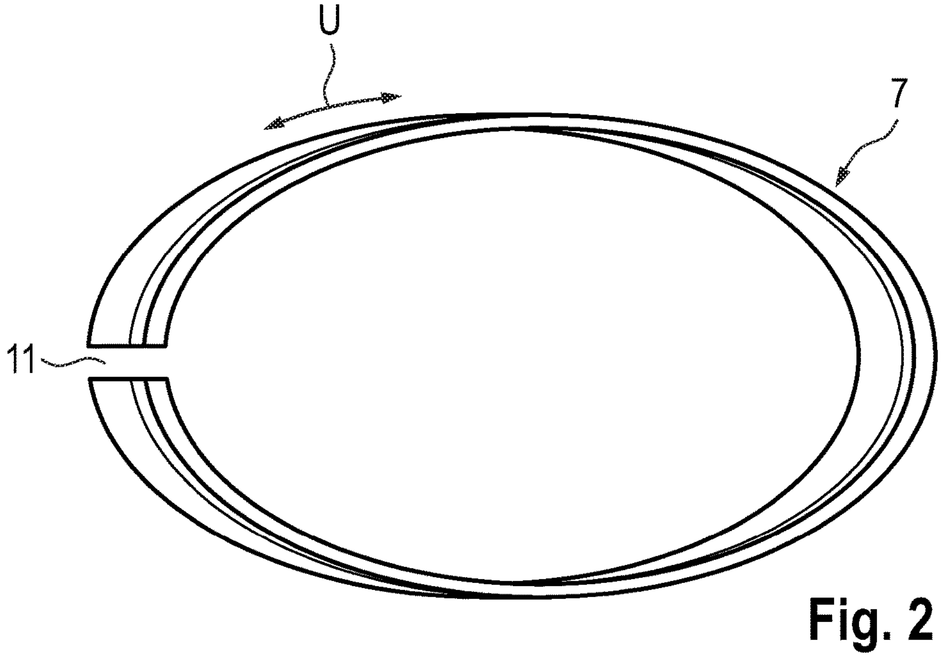
FIG. 2 an isometric view of an inner shell.

The inner shell 7 is inserted into the outer shell 6, preferably such that the inner shell 7 is completely arranged within the outer shell 6. Furthermore, the inner shell 7 is configured elastically. In addition, the inner shell 7 according to FIGS. 1 and 2 is equipped with a recess 11 in the circumferential direction U. The inner shell 7 preferably comprises only a single recess 11 in the circumferential direction U, so that it forms a slotted ring. The elasticity of the inner shell 7, in combination with the recess 11, leads to the inner shell 7 being elastically deformable, such that the inner shell 7 can be inserted into the outer shell 6 from the outside through the mirror opening 8 in order to assemble the mirror housing 2.

According to FIG. 3, the outer shell 6 has an open insertion cross-section 12 in the region of the mirror opening 8 and, in the particular embodiment shown here, also an undercut contour 13. The insertion cross-section 12 is thus suitably formed on the undercut contour 13. In the assembled state, the inner shell 7 has an outer cross-section 14 in the region of the mirror opening 8 which is larger than the insertion cross-section 12. Due to the elastic configuration of the inner shell 7 and the recess 11, the inner shell 7 can be elastically deformed for the assembly on the outer shell 6 such that the recess 11 and the outer cross-section 14 are reduced in size, namely to such an extent that the inner shell 7 can be inserted into the outer shell 6 in this deformed or compressed state through the insertion cross-section 12. As soon as the inner shell 7 is passed through the insertion cross-section, it can be relaxed again, thereby again enlarging the recess 11 and the outer cross-section 14 of the inner shell 7. Subsequently, the inner shell 7 rearwardly engages with the undercut contour 13. The insertion of the inner shell 7 into the outer shell 6 takes place in an insertion direction 15, which is indicated by an arrow in FIG. 3. The inner contour 7 is secured against pulling out of the outer shell 6 against the insertion direction 15 by the undercut contour 13 in a positive-locking manner.

According to FIG. 3, the undercut contour 13 can in particular be configured as a circumferential step running in the circumferential direction U, into which a complementary stop contour 23 of the inner shell 7 engages. In the region of the undercut contour 13, the insertion cross-section 12 is located. Furthermore, an inner cross-section 24 for the outer shell 6 can be defined on the undercut contour 13 by the step, which is configured complementary to the outer cross-section 14 of the inner shell 7 in the relaxed state or in the assembled state. As a result, the inner shell 7 can abut this inner cross-section 24 in the assembled state with its outer cross-section 14. In the assembled state, the inner shell 7 is then supported axially via the stop contour 23 relative to the insertion direction 15 and radially via the outer cross-section 14 on the undercut contour 13 or on the outer shell 6.

In the region of the mirror opening 8, an outer contour 16 of the mirror housing 2 can be seen in FIGS. 1 and 3. This outer contour 16 is circumferentially closed in the circumferential direction U. This outer contour 16 is thereby only formed by a region of the outer shell 6. The outer contour 16 of the mirror housing 2 can thus be configured without a joint, at least in the region of the mirror opening 8. The entire outer shell 6 is expediently designed in a single piece, so that it is possible to design the entire outer contour 16 of the mirror housing 2 without joints, insofar as this outer contour 16 is formed by the outer shell 6. The inner shell 7 is also expediently designed in a single piece, which simplifies its manufacture and assembly.

According to FIG. 1, according to an advantageous embodiment, the recess 11 in the assembled state of the mirror housing 2 can be at least partially filled and/or closed by a closure element 17. The closure element 17 engages with the recess 11 and prevents an elastic deformation of the inner shell 7, which would lead to a reduction in size of the recess 11. Thus, in conjunction with the undercut contour 13, in particular, the positive-locking fixation of the inner shell 7 can be secured on the outer shell 6 using the closing element 17.

Particularly advantageous is a configuration in which the closure element 17 is formed by a component 18 of an outer mirror indicator 19. The component 18 can be, for example, a blinking element or a light-conducting element of the outer mirror indicator 19. The respective component 18 of the outer mirror indicator 19 is thus given an additional function.

According to FIG. 3, the mirror assembly 3 can comprise an actuator 20 with the help of which the mirror 8 is adjustable relative to the mirror housing 6 with regard to its orientation. The frame contour 10 can be suitably designed such that it defines a frame that is high-quality in appearance for the mirror 8 for several or all of the adjustable positions of the mirror 8.

According to FIG. 1, the mirror housing 2 can also comprise a foot 21 with which the mirror housing 2 or the outer mirror 1 can be fastened to the vehicle 4, in particular to the body 5. The foot 21 is fastened to the outer shell 6 for this purpose. The foot 21 can be divided as shown in FIG. 1 in order to allow for a space-saving pivoting of the outer mirror 1 relative to the vehicle 4. A contact zone, along which the two parts of the foot 21 are adjusted when the outer mirror 1 is pivoted, bears the reference number 22.

What is claimed is:

1. A mirror housing for an outer mirror of a passenger vehicle, said mirror housing comprising:

an outer shell for receiving a mirror assembly, the outer shell comprising a mirror opening, which is closed in a circumferential direction (U), for receiving a mirror; and an inner shell fastened inside of the outer shell in a region of the mirror opening, wherein the inner shell lines the mirror opening from an inside of the mirror opening and along the circumferential direction (U), wherein the inner shell comprises a discontinuous and elastic body having two free and disconnected ends and a recess extending in the circumferential direction (U) between the two free and disconnected ends, such that the inner shell is configured to be compressed and inserted into the outer shell from a location that is outside of the outer shell and through the mirror opening in order to assemble the mirror housing, wherein when the inner shell is fastened to the outer shell, the recess is at least partially filled and/or closed by a closure element, wherein the closure element has two sides, each side being in direct contact with one of the two free and disconnected ends of the inner shell, and wherein the closure element comprises a blinking indicator.

2. The mirror housing according to claim 1, wherein the outer shell comprises an open insertion cross-section in the region of the mirror opening, wherein the inner shell, when fastened to the outer shell, comprises an outer cross-section in the region of the mirror opening that is larger than the open insertion cross-section, wherein the inner shell is elastically deformable for assembly on the outer shell so that the recess and the outer cross-section shrink to an extent that the inner shell is configured to be inserted into the outer shell through the insertion cross-section.

3. The mirror housing according to claim 1, wherein the outer shell comprises an undercut contour in the region of the mirror opening, and the inner shell engages rearwardly with the undercut contour in a positive-locking manner.

4. The mirror housing according to claim 1, wherein a circumferential outer contour of the mirror housing that is closed outwardly in the region of the mirror opening is formed exclusively by a region of the outer shell.

5. The mirror housing according to claim 1, wherein the inner shell is integral, and/or the outer shell is integral.

6. The mirror housing according to claim 1, wherein the mirror housing comprises a foot for fastening the mirror housing to the passenger vehicle, which foot is fastened to the outer shell.

7. An outer mirror comprising:

the mirror housing according to claim 1, a mirror assembly comprising a mirror, wherein the mirror assembly is installed into the outer shell of the mirror housing such that the mirror is arranged in the region of the mirror opening of the mirror housing and is encased by the inner shell of the mirror housing.

8. A motor vehicle comprising a body and at least one outer mirror according to claim 7, which is mounted on the body.

9. The mirror housing according to claim 1, wherein the two free and disconnected ends face each other.

10. The mirror housing according to claim 1, wherein the inner shell has a C-shape.

11. The mirror housing according to claim 1, wherein the inner shell is compressible and expandable in the circumferential direction.

* * * * *